United States Patent
Sharpe et al.

(10) Patent No.: US 12,468,675 B2
(45) Date of Patent: Nov. 11, 2025

(54) COMPUTER-BASED SYSTEMS CONFIGURED TO PRE-TRAIN LANGUAGE MODELS FOR ENTITY RESOLUTION AND METHODS OF USE THEREOF

(71) Applicant: Capital One Services, LLC, McLean, VA (US)

(72) Inventors: Samuel Sharpe, Cambridge, MA (US); Daniele Rosa, Saugus, MA (US); Adam Badawy, Los Angeles, CA (US)

(73) Assignee: Capital One Services, LLC, McLean, VA (US)

( * ) Notice: Subject to any disclaimer, the term of this patent is extended or adjusted under 35 U.S.C. 154(b) by 7 days.

(21) Appl. No.: 18/531,166

(22) Filed: Dec. 6, 2023

(65) Prior Publication Data

US 2025/0190407 A1    Jun. 12, 2025

(51) Int. Cl.
*G06F 16/215* (2019.01)
*G06F 16/22* (2019.01)

(52) U.S. Cl.
CPC .......... *G06F 16/215* (2019.01); *G06F 16/22* (2019.01)

(58) Field of Classification Search
CPC .............................. G06F 16/215; G06F 16/22
USPC .......................................................... 707/692
See application file for complete search history.

(56) References Cited

U.S. PATENT DOCUMENTS

| | | | |
|---|---|---|---|
| 12,079,282 B2* | 9/2024 | Mumcuyan | G06F 18/22 |
| 2019/0311229 A1* | 10/2019 | Qian | G06F 18/41 |
| 2021/0406478 A1 | 12/2021 | Klein et al. | |
| 2022/0253725 A1* | 8/2022 | Feng | G06N 20/00 |
| 2023/0050573 A1 | 2/2023 | Liu et al. | |

OTHER PUBLICATIONS

R. Wang, Y. Li and J. Wang, "Sudowoodo: Contrastive Self-supervised Learning for Multi-purpose Data Integration and Preparation," 2023 IEEE 39th International Conference on Data Engineering (ICDE), Anaheim, CA, USA, 2023, pp. 1502-1515, doi: 10.1109/ICDE55515.2023.00391. published Apr. 1, 2023. (Year: 2023).*

* cited by examiner

Primary Examiner — Michael Pham
(74) Attorney, Agent, or Firm — Greenberg Traurig, LLP (57) ABSTRACT

In some embodiments, the present disclosure provides an exemplary method that may include steps of receiving a dataset of entity records, identifying, a candidate entity record of the plurality of entity records, utilizing a set of predefined rules to generate a first augmented record, and a second augmented record, utilizing, at least one contrastive loss optimization functions to train parameters of an unsupervised self-contrastive machine learning language model to distinguish between similar entity records representing a same entity and dissimilar entity records.

21 Claims, 4 Drawing Sheets

COMPUTER-BASED SYSTEMS CONFIGURED TO PRE-TRAIN LANGUAGE MODELS FOR ENTITY RESOLUTION AND METHODS OF USE THEREOF

FIELD OF TECHNOLOGY

The present disclosure generally relates to computer-based systems that utilize a pre-trained language model on entity records that are augmented based on a set a pre-defined rules and utilizing an unsupervised self-contrasting ML model to determine a positive and/or negative contrast between a candidate entity record and the augmented entity records and methods of use thereof.

BACKGROUND OF TECHNOLOGY

Entity record resolution (e.g., matching similar or the same entities) in a large database of entities is a difficult problem due to the lack of standardization of database entry systems for entity records, the large number of sources from which entity records can be retrieved and errors in entity records or duplicates of records.

SUMMARY OF DESCRIBED SUBJECT MATTER

In some aspects, the techniques described herein relate to a computer-implemented method including: receiving, by at least one processor, a dataset of entity records, the dataset including a plurality of entity records associated with one or more entities, wherein each entity record includes at least one element; identifying, by at least one processor, a candidate entity record of the plurality of entity records; utilizing, by the at least one processor, a set of predefined rules generate a first augmented record, and a second augmented record by augmenting the at least one element of the candidate entity record; wherein the first augmented record includes a first augmentation to the at least one element; wherein the first augmentation represents a positive contrast between the first augmented record and the candidate entity record based at least in part on the set of predefined rules; wherein the second augmented record includes a second augmentation to the at least one element; wherein the second augmentation includes a negative contrast between the second augmented record and the candidate entity record based at least in part on the set of predefined rules; utilizing, by the at least one processor, at least one contrastive loss optimization to train parameters of an unsupervised self-contrastive machine learning language model to distinguish between similar entity records representing a same entity and dissimilar entity records represented different entities based at least in part on the at least one element of each entity record; wherein the at least one contrastive loss optimization trains the parameters based at least in part on: the positive contrast between the first augmented record and the candidate entity record, and the negative contrast between the second augmented record and the candidate entity record; and utilizing, by the at least one processor, an index engine to index the entity records determined to have a positive contrast with the candidate entity record; wherein the index engine indexes the identified entity records into at least one database table so as to merge the entity records having the positive contrast with the candidate entity record.

In some aspects, the techniques described herein relate to at least one computer-readable storage medium having encoded thereon software instructions that, when executed by at least one processor, cause the at least one processor to perform steps to: receive, by at least one processor, a dataset of entity records, the dataset including a plurality of entity records associated with one or more entities, wherein each entity record includes at least one element; identify, by at least one processor, a candidate entity record of the plurality of entity records; utilize, by the at least one processor, a set of predefined rules generate a first augmented record, and a second augmented record by augmenting the at least one element of the candidate entity record; wherein the first augmented record includes a first augmentation to the at least one element; wherein the first augmentation represents a positive contrast between the first augmented record and the candidate entity record based at least in part on the set of predefined rules; wherein the second augmented record includes a second augmentation to the at least one element; wherein the second augmentation includes a negative contrast between the second augmented record and the candidate entity record based at least in part on the set of predefined rules; utilize, by the at least one processor, at least one contrastive loss optimization to train parameters of an unsupervised self-contrastive machine learning language model to distinguish between similar entity records representing a same entity and dissimilar entity records represented different entities based at least in part on the at least one element of each entity record; wherein the at least one contrastive loss optimization trains the parameters based at least in part on: the positive contrast between the first augmented record and the candidate entity record, and the negative contrast between the second augmented record and the candidate entity record; utilize, by the at least one processor, an index engine to identify the entity records determined to have a positive contrast with the candidate entity record; wherein the index engine indexes the identified entity records into at least one database table so as to merge the entity records having the positive contrast with the candidate entity record.

In some aspects, the techniques described herein relate to a system including: a non-transient computer memory, storing software instructions; and at least one processor of a first computing device associated with a user; wherein, when the at least one processor executes the software instructions, the first computing device is programmed to: receive, by at least one processor, a dataset of entity records, the dataset including a plurality of entity records associated with one or more entities, wherein each entity record includes at least one element; identify, by at least one processor, a candidate entity record of the plurality of entity records; utilize, by the at least one processor, a set of predefined rules generate a first augmented record, and a second augmented record by augmenting the at least one element of the candidate entity record; wherein the first augmented record includes a first augmentation to the at least one element; wherein the first augmentation represents a positive contrast between the first augmented record and the candidate entity record based at least in part on the set of predefined rules; wherein the second augmented record includes a second augmentation to the at least one element; wherein the second augmentation includes a negative contrast between the second augmented record and the candidate entity record based at least in part on the set of predefined rules; utilize, by the at least one processor, at least one contrastive loss optimization to train parameters of an unsupervised self-contrastive machine learning language model to distinguish between similar entity records representing a same entity and dissimilar entity records represented different entities based at least in part on the at least one element of each entity record;

wherein the at least one contrastive loss optimization trains the parameters based at least in part on: the positive contrast between the first augmented record and the candidate entity record, and the negative contrast between the second augmented record and the candidate entity record; utilize, by the at least one processor, an index engine to identify the entity records determined to have a positive contrast with the candidate entity record; wherein the index engine indexes the identified entity records into at least one database table so as to merge the entity records having the positive contrast with the candidate entity record.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a creator interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

Entity resolution is the process of determining information about an entity from a database of entity records. The process is daunting as the entity records can come from any source. One source may be online public databases that store entity records, government databases, business organizations, social media websites, or even scanning/scraping the internet for entity records. The entity record format may be disparate for example, text, JSON, XML, CSV, Parquet, Avro, or any similar type of format. Once collected, the entity records may be validated to be useful, meaning the associated information may be corrected (e.g., business name, owner, address, type of business, services/products offered).

The complexity of entity resolution then is strongly dependent on the entity record data types, elements, format, and structure. Entity resolution may involve three primary tasks: 1) entity record deduplication, the elimination of duplicate records for the same entity record, 2) entity record linkage, identifying an entity record from many different sources, 3) canonicalization, converting the entity records into the same form.

A single entity record, for example a "midtown computer repair" may appear in multiple databases. In one database the entity record may appear as "computer repair", absent the first adjective "midtown". In this instance, entity record resolution may appear to be simple and straightforward, however, there may hundreds of thousands of entity records for "computer repair".

Current solutions for entity resolution are typically based on some form of fuzzy logic, where a user defines a set of rules for the system to validate an entity record based on subtle variations of the entity record data elements. This system is fraught with drawbacks as the number of possible permutations of an entity record quickly becomes intractable. Updating rules based on verified results is also a time-consuming laborious process that is not practical in large datasets.

This disclosure contemplates a system that resolves entity records by utilizing a self-contrastive machine learning model that determines a positive contrast and a negative contrast of entity records compared to a candidate entity record that has been augmented by a pre-defined set of rules. The self-contrastive machine learning model has a contrastive loss optimization that trains the parameters of the model to maximize and minimize the positive and/or negative contrast.

The system is self-supervised and capable of adjusting parameters of the model to resolve entity records, eliminating the need for any manual updates to parameters. The system minimizes the number of parameters for augmentation to provide salient results. The system reduces data flow and processing time, thus eliminating the need for multiple data type data storage and streamlines processes. The system eliminates the need for manual verification of results, and it does not rely on any manual intervention for updating rules.

In some embodiments, the present computer-implemented disclosure may utilize an illustrative augment module to resolve entity records of a dataset. The augment module may be configured to resolve entity records of a dataset independently and may have a bus communicatively connecting at least one processor, at least one memory, at least one storage device, and multiple sub-modules that resolves entity records. The augment module is not limited to operating independently and may resolve entity records with other computer systems. The augment module may retrieve entity records stored on a virtual network, a server device, a network database, a cloud platform, a portable computer, or any similar computer system capable of storing entity records.

In some embodiments, the illustrative augment module may be configured with at least one sub module(s) communicatively coupled to at least one processor, at least one bus, at least one system memory (RAM), at least one network interface, at least on input interface (e.g., keyboard, mouse or any similar device) and an output interface (e.g., monitor, printer, etc.). The illustrative augment module may be configured with at least one sub module(s), for example an augment engine that may be capable of augmenting a candidate entity record of a dataset, a self-contrastive engine that may be capable of determining a positive and/or negative contrast of entity records compared to a candidate entity record, a contrast optimization engine that may be capable of training parameters of the unsupervised self-contrastive engine, and an index engine, that may be capable of indexing entity records into respective records. The sub modules of the augment module may be configured to operate in any similar computer systems, and are not limited to operating in the augment module as disclosed.

In some embodiments, the computer-based system may include the illustrative augment module may be encoded thereon as software instructions on at least one computer-readable storage medium that, when executed by at least one processor, cause the at least one processor to perform entity resolution of a dataset of entity records. In some embodiments, the computer-based system including the illustrative augment module may include a non-transient computer memory storing software instructions when executed by at least one processor resolve entity records of a dataset.

In some embodiments, the illustrative augment engine of the augment module may be programmed with a predefined set of rules that determine an augmentation to be carried out on a candidate entity record. The predefined set of rules may depend on the type of entity record, however, they may be any set of rules that are found to resolve entity records by a self-contrastive machine learning language model.

In some embodiments, the predefined set of rules may operate on at least one element of the entity record. In some embodiments, the predefined set of rules may include a first augmentation that imposes a positioning shift of at least one element of the candidate entity record. As an example, a candidate entity record may include an element that is a business name "x y z", the predefined set of rules may impose a position shift of "y x z". The augment engine may then determine based on a predefined set of rules a second augmentation that imposes a random entity record of a business name for example "x b z". The augmented entity records and the candidate entity record may then be compared to the plurality of entity records utilizing a self-contrastive engine to determine a positive and/or negative contrast with the plurality of entity records.

In some embodiments, the self-contrastive engine may utilize a noise contrastive loss (NCL) framework to determine a positive and/or negative contrast with the plurality of entity records. The NCL framework may impose a lower bound on the mutual information of the augmented entity records and then the NCL framework pulls the entity records that are positive, or "similar," to the candidate entity record together, and/or pushes the entity records that are negative, or "dissimilar," apart.

In some embodiments, the illustrative augment module may include a self-contrastive optimization engine that may train the parameters of the self-contrastive machine learning language model to determine the positive and/or negative contrast of the entity records. The self-contrastive loss optimization engine may utilize an InfoNCE function or an NT-Xent function to serve as a loss optimization function. The illustrative self-contrastive loss optimization engine may utilize any known or similar type of loss optimization function that is capable of updating the rules of the self-contrastive engine to resolve entity records in the most efficient manner.

In some embodiments, the illustrative contrastive loss optimization engine may utilize at least one scoring vector that measures compatibility between two vectors and determines the actual form of the loss that enforces the minimization and maximization between the candidate entity records and the augmented entity records. The illustrative self-contrastive loss optimization engine may utilize these terms to update the rules of the self-contrastive engine. The illustrative self-contrastive loss optimization engine may utilize any scoring function that measures contrast between the entity records for example, Manhattan, Euclidean distance, hamming distance, the dot product between two vectors, probabilistic NCE-based losses or mutual information functions.

In some embodiments, the illustrative augment module may include an index engine. The illustrative index engine may identify and sort the entity records determined to have a positive contrast into a positive contrast database. The illustrative index engine may utilize a scoring function to identify the positive and/or negative contrast entity records for example, Manhattan, Euclidean distance, hamming distance, the dot product between two vectors, probabilistic NCE-based losses or mutual information functions or any similar method of scoring. The positive contrast database for example, may include records that have a high probability of being duplicate entity records as the self-contrastive engine determines positive contrast of entity records from the candidate entity record the augmented entity records and plurality of entity records. The positive contrast entity records may be stored in type of computer-implemented system such as a virtual database, a server device, a cloud platform and in any format for example, text, JSON, XML, CSV, Parquet, Avro, or any similar type of format.

In some embodiments, the illustrative index engine of the illustrative augment module may sort the negative contrast entity records into a database. The negative contrast entity records may be unique instances entity records, as the self-contrastive engine determines a negative contrast of entity records from the candidate entity record, the augmented record and the plurality of entity records. The negative contrast entity records may be stored in type of computer-implemented system such as a virtual database, a server device, a cloud platform and in any format for example, text, JSON, XML, CSV, Parquet, Avro, or any similar type of format.

Figure 1:
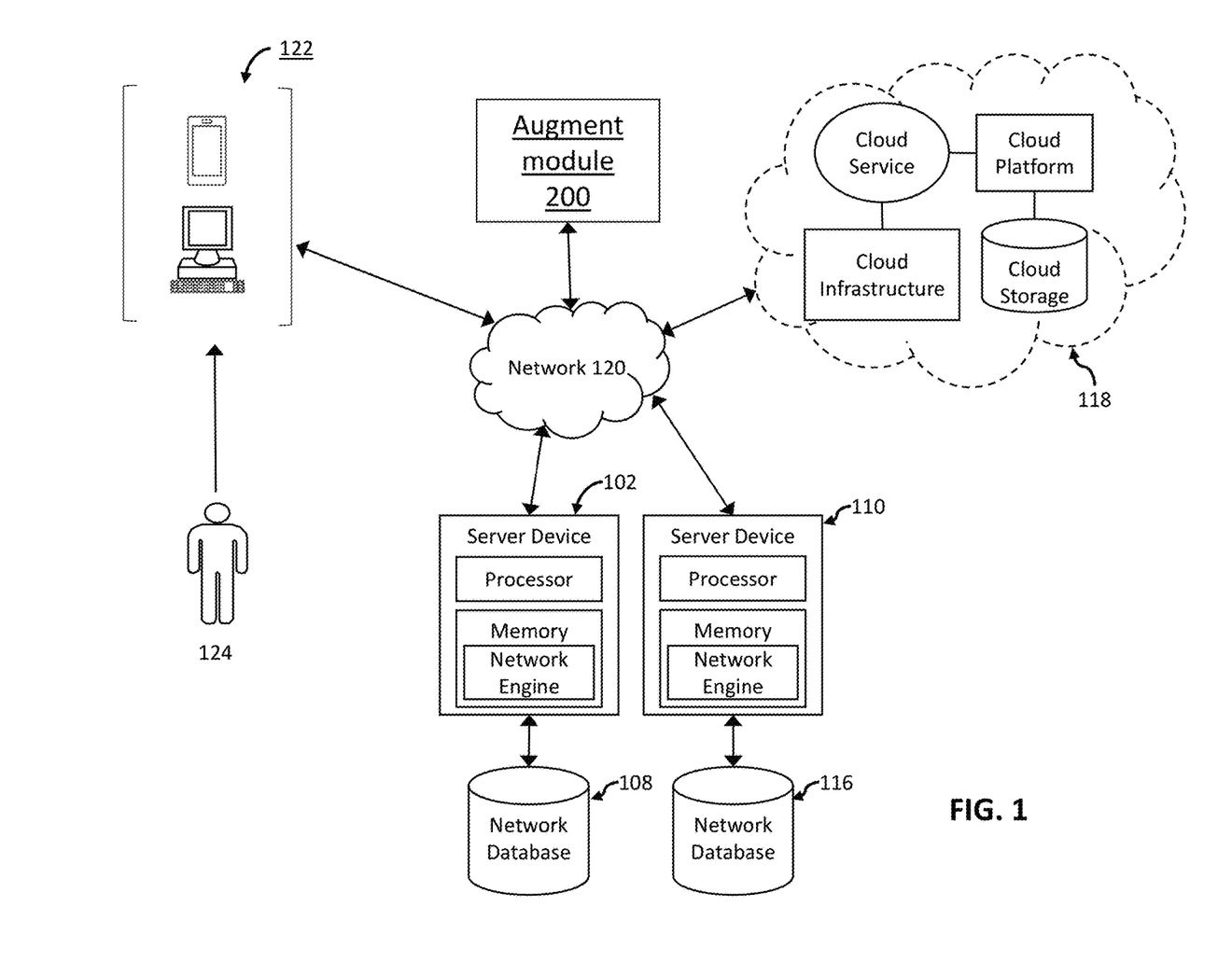
FIG. 1 depicts an illustration of an exemplary computer-based system and platform configured to utilize an augment module capable of augmenting entity records of a dataset and determining by a self-contrastive model a positive and/or negative contrast of a candidate entity record and an augmented record, in accordance with one or more embodiments of the present disclosure.

FIG. 1 depicts an illustration of an exemplary computer-based system and platform configured to utilize an augment module capable of augmenting a dataset of entity records and determining by a self-contrastive model a positive and/or negative contrast of a candidate entity record and an augmented record, in accordance with one or more embodiments of the present disclosure.

In some embodiments, the illustrative computer-based system and platform may include an augment module 200 communicatively coupled to a network 120. The illustrative augment module 200 may operate as an independent module capable of resolving entities in a system, or it may operate as part of a virtual machine in a network 120, it may also operate on a server device 102, server device 110, or it may operate on computing device(s) 122. The illustrative augment module 200 may retrieve a plurality of entity records from any of a network database 108 or network database 116 communicatively coupled to server device 102 or server device 110, it may also retrieve entity records from any system in a cloud platform 118, or any of computing device(s) 122.

In some embodiments, the illustrative augment module 200 receives entity records to perform entity resolution by any wired or wireless communications medium such as any analog telephone line communication through a modem, any type of wireless communications medium such as WiFi, WiMax, CDMA, satellite, ZigBee, 3G, 4G, 5G, GSM, GPRS, etc., and the like.

In some embodiments, the illustrative augment module 200 of the computer-based system is configured to resolve a dataset of entity records. The illustrative augment module 200 may utilize a pre trained language model that utilizes augmented entity records that are augmented based on a predefined set of rules. The illustrative augment module 200 utilizes a self-supervised contrastive model to distinguish a positive and/or negative contrast between a candidate entity record and the augmented entity records. The illustrative module 200 may utilize a contrastive optimization model to determine parameters to update the self-supervised contrastive model.

In some embodiments, the illustrative augment module 200 of the computer-based system is configured to resolve entity records of for example business entities. The computer based system may be configured to utilize, by at least one processor, a first and second augmentation of a candidate entity record, train a self-contrastive model on the entity records and determine a positive and/or negative contrast between the candidate entity record, the augmented records and the plurality of entity records. The plurality of entity records may be retrieved from a plurality of sources. Each entity record source may contain duplicates of the same entity record, the entity records may be incorrect, mislabeled, incorrectly ordered, outdated, or may have any similar issue related to entity resolution. The illustrative augment module 200 of the computer-based system may resolve at least one element of an entity record, for example a business name. The business name may appear multiple times in a network database 108 or network database 116. In most cases, it is likely that duplicates of same entity record exist, this means that a significant cost could be incurred by an organization attempting to contact this business entity. For example, in the case where a telemarketer is employed to place calls to each of the duplicate entity records of the business entity. Significant costs can also be incurred by an organization utilizing a system that generates mail, whether electronic mail or physical mail to contact duplicate or mislabeled business entity. There are also significant peripheral costs such as computing systems and software required for handling and storage of worthless entity record data. The illustrative augment module 200 of the computer-based system is capable of utilizing a pre trained self-contrastive model to resolve entity records resulting in reduced time spent by employees trying to contact duplicate or incorrect business entities, reducing costs associated with mail/email systems, and reducing costs associated with hardware and software of computing systems.

Figure 2:
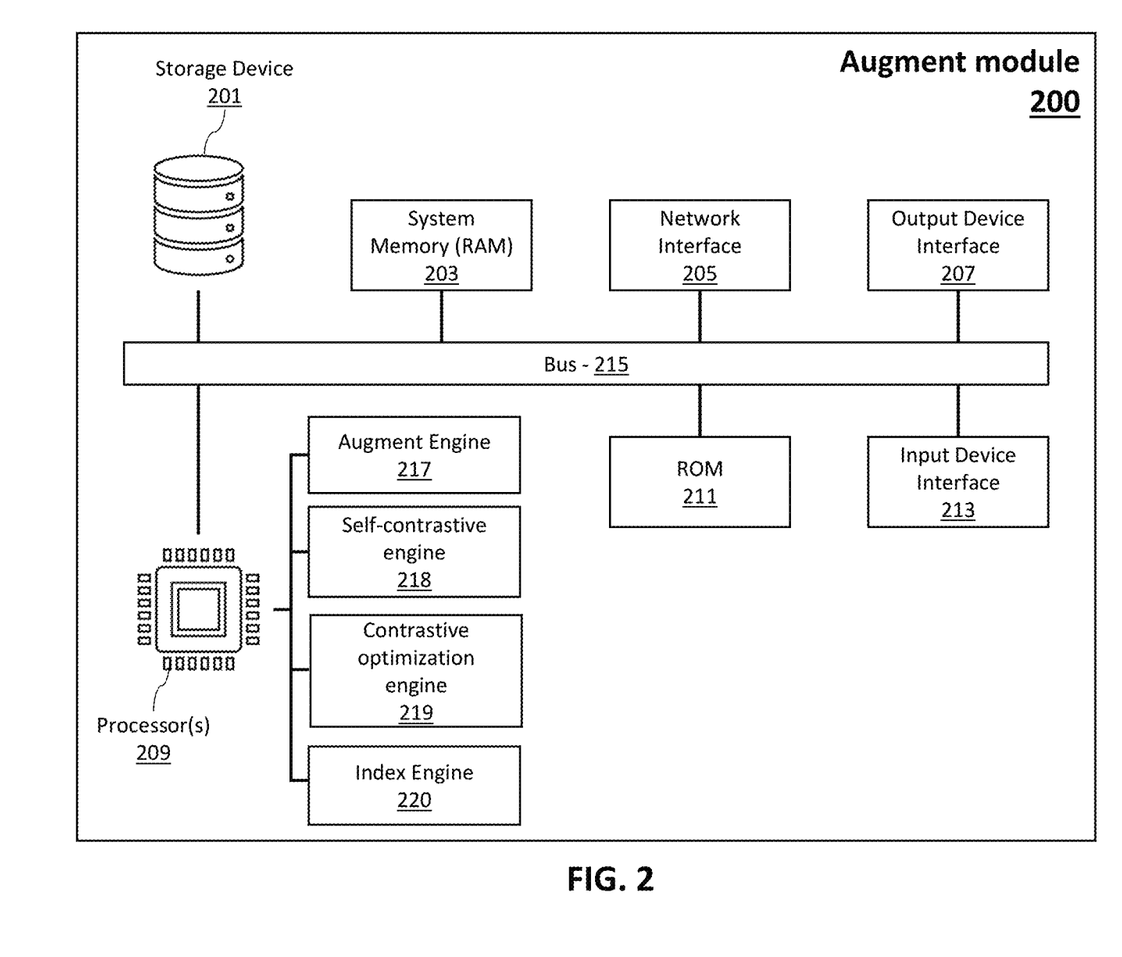
FIG. 2 depicts a block diagram of an exemplary computer-based module for determining a positive and/or negative contrast of an augmented entity record and a candidate entity record of a dataset in accordance with one or more embodiments of the present disclosure.

FIG. 2 depicts a block diagram of an exemplary computer-based module for determining a positive and/or negative contrast of an augmented entity record and a candidate entity record of a dataset in accordance with one or more embodiments of the present disclosure.

In some embodiments, the illustrative augment module 200 may include an augment engine 217, a self-contrastive engine 218, a contrastive optimization engine 219, an index engine 220 communicatively coupled by a bus 215 to a processor(s) 209, a storage device 201 a system memory (RAM) 203, a network interface 205, a ROM 211, an output device interface 207 and a input device interface 213. The illustrative augment engine 217 may be configured with a predefined set of rules for determining a candidate entity record, and an augmentation of the candidate entity record stored in storage device 201. The illustrative augment engine 217 may determine the predefined set of rules based on the data of the entity records. The augment engine 217 may be configured to receive a set of rules that determine the augmentation from an input device interface 213 (e.g., keyboard) input by a user 124.

In some embodiments the predefined set of rules of the augment engine 217 may be any of a set of transformations or transpositions of text, numeral, or character of at least one element of the candidate entity record. The transformations may be an inter element transpositions for example randomization of at least one element of a candidate entity record. The transformations may be carried out on multiple rows and columns of the candidate entity record. The augment engine 217 may utilize any type of rules for augmentation such as word deletion, span deletion, token reordering, and synonym substitution for augmentation or other token-level augmentation such as synonym replacement, random insertion, random swap, and random deletion, may also be used that increase the likelihood of generating positive contrast entity records. The augment engine 217 is not limited to any specific set of rules to determine an augmentation, any set of rules that produce a strong contrast enabling entity resolution may be used. The illustrative augment engine 217 utilizing a set of rules performs a first augmentation on a candidate entity record that represents a positive contrast and performs a second augmentation on a candidate entity record that represents a negative contrast. The candidate entity may be for example a business entity record that is validated (e.g., verified entire record). In this instance, the illustrative self-contrastive engine 218 may determine the positive contrast entity records (e.g., duplicates) from the plurality of entity records. Conversely, the illustrative self-contrastive engine may distinguish the negative contrast entity records (e.g., unique instances) from the plurality of entity records.

In some embodiments, the self-contrastive engine 218 may include one or more machine learning models for comparing records. To do so, the self-contrastive model 218 may generate embeddings of each record to facilitate comparison. In some embodiments, the embeddings may include a separate word embedding for each attribute of each record to create separate word embeddings representative of each separate attribute, and encoding the word embeddings of each record into a respective word embedding feature vector. Alternatively or in addition, the attributes of a record may be restructured into a sentence or string of text, and the sentence or string may then be embedded to create word embedding(s) representative of the sentence or string.

In some embodiments, the self-contrastive engine 218 may compare two or more records by comparing the respective word embeddings, e.g., using a similarity scoring function. In some embodiments, the scoring function may be any of Manhattan, Euclidean distance, hamming distance, the dot product between two vectors, probabilistic NCE-based losses, or mutual information functions, or any other similarity measurement or any combination thereof. Thus, the similarity of the embeddings produced by the self-contrastive engine 218 may be measured so as to assess the similarity of the associated records.

For example, for two entity records including, e.g., an augmented entity record produced through augmentation of a candidate entity record (e.g., by the augment engine 217), the self-contrastive engine 218 may determine embeddings for each entity record and measure the similarity between the two augmented entity records based on the embeddings. In some embodiments, the augmentation of the augmented entity record is positive, e.g., is configured to produce an augmented entity record that represents a same entity as the candidate entity record, such as by making a change to spelling, format or other formalistic, typographical and/or grammatical change among other changes or any combination thereof. In some embodiments, the augmentation of the augmented entity record is negative, e.g., is configured to produce an augmented entity record that represents a different entity from the candidate entity record, such as by changing a word, telephone number, address, location, name, etc. such that the augmentation provides a different entity, among other substantive changes or any combination thereof. As a result, the positive augmentation and the negative augmentation may produce augmented entities records having a known relationship to the candidate entity record (e.g., "same" or "different" entities).

In some embodiments, the parameters of the illustrative self-contrastive engine 218 may be trained by the illustrative contrastive optimization engine 219 to produce embeddings that more accurately reflect whether differences between entity records are positive or negative. The contrastive optimization engine 219 may utilize an optimization function to distinguish a positive and/or negative contrast of the augmented entity records based on the type of augmentation (e.g., positive or negative) and thus whether each augmented entity record represents a same or different entity compared to the candidate entity record. Accordingly, the contrastive optimization engine 219 may implement an optimization function as any one or more of a variety for example infoNCE or NT-Xent or any similar optimization function that increases a positive and/or negative contrast of the entity records. For example, the optimization engine may use the known relationship of each augmented entity record to determine a contrastive error of the similarity score between each augmented entity record and the candidate entity record. The optimization function may then backpropagate the error to update the parameters of self-contrastive engine 218 to produce embeddings that more accurately reflect the importance of augmentations to data in entity records. As a result, the self-contrastive engine 218 may be trained to better determine whether differences between one entity record and another are "minor" or "significant" based on the similarity score and the embeddings produced by the self-contrastive engine 218.

In some embodiments, the illustrative augment module 200 may be configured with a self-contrastive engine 218. The illustrative self-contrastive engine 218 may be configured as a pre trained machine learning language to distinguish between similar entity records. The engine architecture may include at least one input layer, at least one hidden layer, and at least one output layer that utilizes and non-linear activation function. The engine architecture may also include a backpropagation function to back propagate activations in the multi-layer network to strengthen correlations. The processor(s) 209 of the augment module 200 may retrieve a first augmented entity record and a second augmented entity record from the augment engine 217, and feed to the self-contrastive engine 218 to determine a positive and/or negative contrast of the augmented entity records to the candidate entity record. In some embodiments the illustrative self-contrastive engine 218 may employ any similar machine learning architecture to achieve a positive and/or negative contrast entity record from the augmented entity records the candidate entity record and the plurality of entity records such as a bidirectional neural network, a convolutional neural network, a multi-layer perceptron and the like.

The illustrative contrastive optimization engine 219 of the augment module 200 may be configured to train the parameters of the self-contrastive engine 218 by utilizing at least one optimization function. The at least one processor(s) may retrieve the feature parameters of the self-contrastive engine 218 and the contrastive optimization engine 219 of the augment module 200 may update the at least one layer of the self-contrastive engine 218 based on the optimization function. The optimization function may employ infoNCE or NT-Xent or any similar optimization function that increases a positive and/or negative contrast of the entity records. The illustrative contrastive optimization engine 219 may employ at least one scoring function to determine a score of the entity records. The scoring function may be any of Manhattan, Euclidean distance, hamming distance, the dot product between two vectors, probabilistic NCE-based losses, or mutual information functions.

In some embodiments, the illustrative augment module 200 may be configured with an index engine 220. In some embodiments, the processor(s) 209 may retrieve entity records from the contrastive optimization engine 219 and send to the index engine 220. In some embodiments, the index engine 220 generates at least one database for the positive and/or negative entity records that have been processed by the contrastive optimization engine 219. The at least one database and in any format for example, text, JSON, XML, CSV, Parquet, Avro, or any similar type of format.

Figure 3:
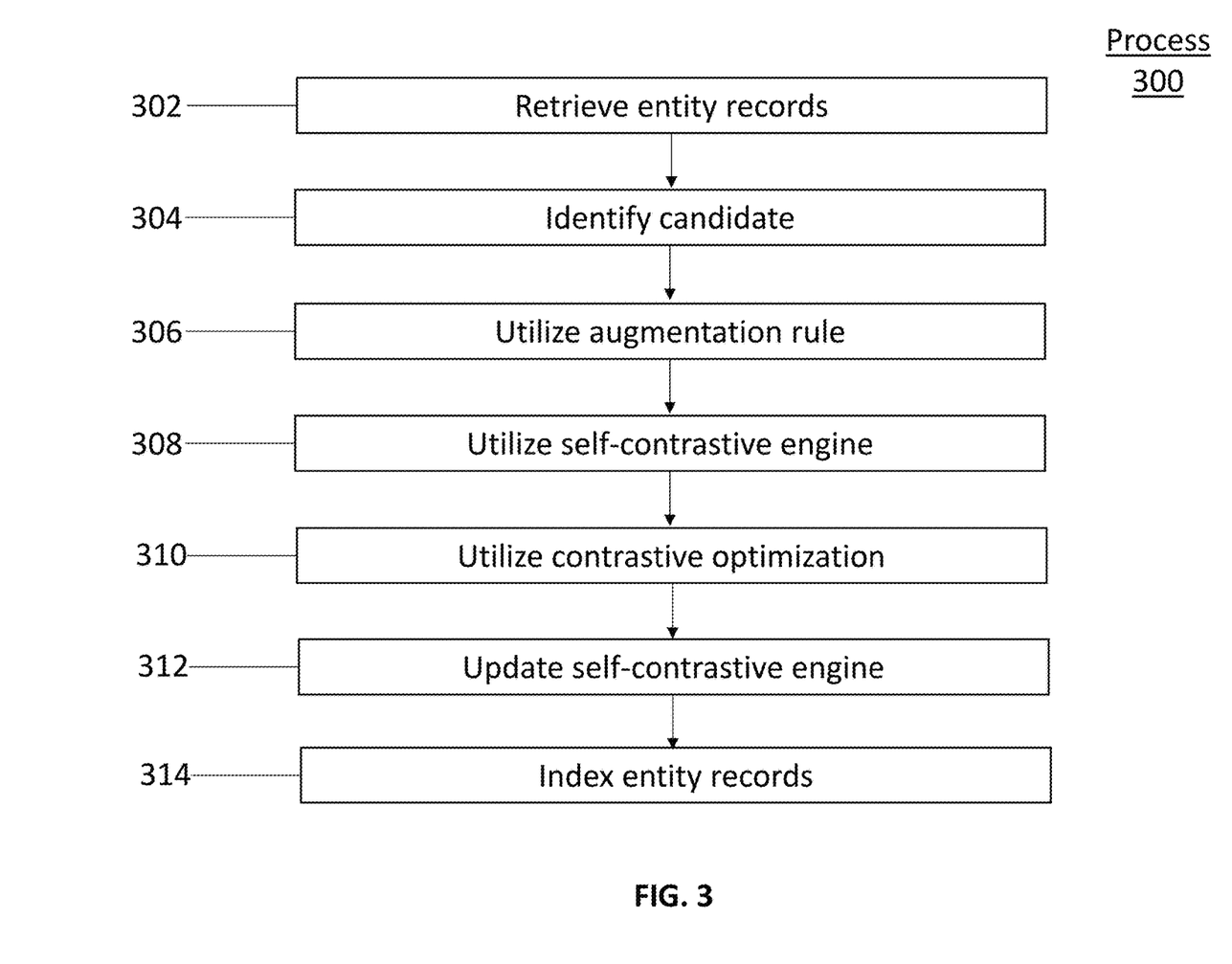
FIG. 3 is a flowchart illustrating operational steps of augmenting entity records and determining a contrast of the augmented entity record of a dataset, in accordance with one or more embodiments of the present disclosure.

FIG. 3 is a flowchart of Process 300 illustrating operational steps of augmenting entity records and determining a contrast of the augmented entity record, in accordance with one or more embodiments of the present disclosure.

In some embodiments, in Step 302 the at least one processor(s) 209 of the illustrative augment module 200 may retrieve at least one entity record of a plurality of entity records from a network database 108, network database 116, network 120, or a cloud platform 118. The processor(s) 209 of the illustrative augment module 200 randomly retrieve an entity record from a database, or may retrieve dependent on a pre-determined rule.

In some embodiments, the processor(s) 209 may determine that the at least one entity record retrieved from a network database 108 is a candidate entity record. The candidate entity record may be an entity record that has been verified or validated in some form, meaning that the information of the elements of the candidate entity records has been confirmed to be accurate.

In some embodiments, at Step 304 the augment engine 217 of the illustrative augment module 200 may identify a candidate entity record from the plurality of entity records retrieved by the processor(s) 209 in Step 302. The augment engine 217 may randomly retrieve an entity record or may retrieve an entity record based on some predefined rule, such as a recency rule that determines the establishment based on associated information of the entity record a recency of the entity record or a confidence rule that determines based on validation of the entity record a confidence of the accuracy of the entity record.

In some embodiments at Step 306 the augment engine 217 utilizes at least one predefined rule to perform, by at least one processor an augmentation of the candidate entity record. The augmentation may be any of any of a set of transformations or transpositions of text, numeral, or character of at least one element of the candidate entity record. The transformations may be an inter element transpositions for example randomization of at least one element of a candidate entity record. The transformations may be carried out on multiple rows and columns of the candidate entity record. The augment engine 217 may utilize any type of rules for augmentation such as word deletion, span deletion, token reordering, and synonym substitution for augmentation or other token-level augmentation such as synonym replacement, random insertion, random swap, and random deletion, may also be used that increase the likelihood of generating positive contrast entity records. The augment engine 217 is not limited to any specific set of rules to determine an augmentation, any set of rules that produce a strong contrast enabling entity resolution may be used.

In some embodiments, in Step 308 the self-contrastive engine 218 determines a positive contrast and a negative contrast of the first augmented entity record and the second augmented entity record from the plurality of entity records. In some embodiments, the contrastive optimization engine 219 utilizes an optimization function to determine parameters for the self-contrastive engine 218. In some embodiments, the self-contrastive engine 218 may be configured with predefined parameters to determine a positive and/or negative contrast of the plurality of entity records. The self-contrastive engine 218 may utilize any model architecture and may include at least one input layer, at least one hidden layer, and at least one output layer that utilizes and non-linear activation function. The engine architecture may also include a backpropagation function to back propagate activations to the at least one layer network of the self-contrastive engine 218. In some embodiments the illustrative self-contrastive engine 218 may employ any similar machine learning architecture to achieve a positive and/or negative contrast entity record from the augmented entity records the candidate entity record and the plurality of entity records such as a bidirectional neural network, a convolutional neural network, a multi-layer perceptron and the like.

In some embodiments, at Step 310 the illustrative augment module 200 may utilize a contrastive optimization engine 219 to optimize a positive and/or negative contrast of the augmented entity records. In some embodiments, the at least one processor(s) may retrieve the feature parameters of the self-contrastive engine 218 and the contrastive optimization engine 219 of the augment module 200 may update the at least one layer of the self-contrastive engine 218 based on the optimization function. The optimization function may employ infoNCE or NT-Xent or any similar optimization function that increases a positive and/or negative contrast of the entity records.

In some embodiments, at Step 310 the illustrative contrastive optimization engine 219 may employ at least one scoring function to determine a score of the entity records. The scoring function may be any of Manhattan, Euclidean distance, hamming distance, the dot product between two vectors, probabilistic NCE-based losses, or mutual information functions.

In some embodiments at Step 312 the illustrative contrastive optimization engine 219 may utilize the parameters of the optimization function to update the parameters of the self-contrastive engine 218 in order minimize the positive contrast between the augmented entity record and the candidate entity record.

In some embodiments, at Step 314 the illustrative index engine 220 of the augment module 200 may employ a scoring function to determine a score of the entity records. The scoring function may be any of but not limited to Manhattan, Euclidean distance, hamming distance, the dot product between two vectors, probabilistic NCE-based losses, or mutual information functions. In some embodiments at Step 314 the index engine 220 identify the positive contrast entity records and the negative contrast entity records based on the score as detailed above. The illustrative index engine 220 may generate at least one index in a database to index the positive entity records, merging the records, as the plurality of entity records share a high similarity with candidate entity records, and are likely duplicates. The illustrative index engine 220 may generate at least one index in a database to index the negative contrast entity records, as the plurality of entity records share a low similarity with the candidate entity record and are likely unique entries. The augment engine 217 of the illustrative augment module 200 may retrieve an entity record from the negative contrast entity record index generated by the index engine 220, iteratively processing each entity record of the negative contrast entity record index through the computer-based system to determine a positive and/or negative contrast between a candidate entity record the augmented entity records and the plurality of negative contrast entity record index.

Figure 4:
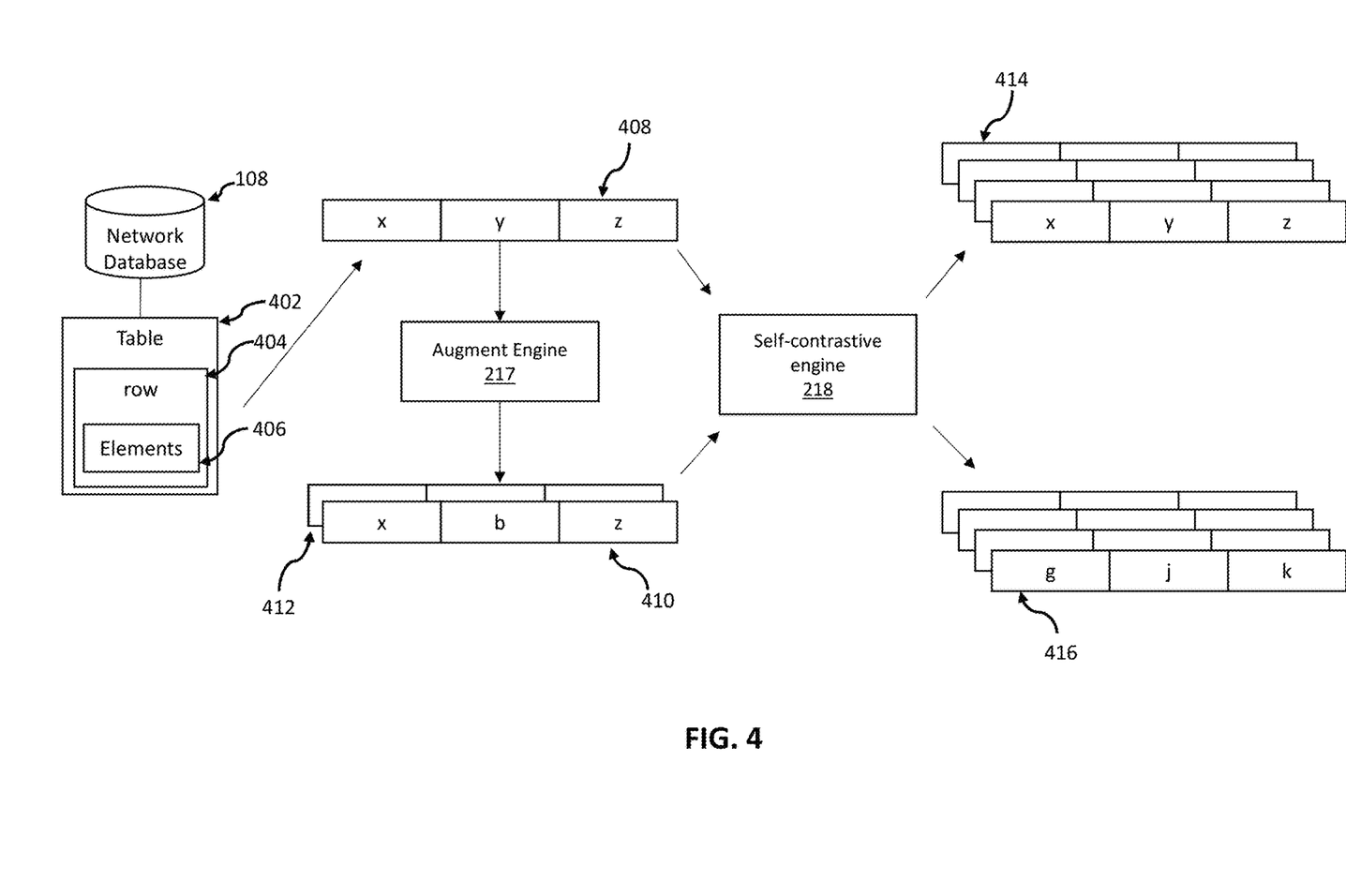
FIG. 4 depicts a block diagram of an exemplary computer-based method of retrieving an entity record augmenting an entity record of a dataset and determining a positive and/or negative contrast with a self-contrast engine, in accordance with one or more embodiments of the present disclosure.

FIG. 4 depicts a block diagram of an exemplary computer-based method of retrieving an entity record augmenting an entity record and determining a positive and/or negative contrast with a self-contrast engine, in accordance with one or more embodiments of the present disclosure.

In some embodiments, the augment engine 217 of the illustrative augment module 200 may retrieve at least one entity record from network database 108. The entity record may be in the form of a table 402 having a row 404 and a plurality of elements 406. In some embodiments, the augment engine 217 may determine a candidate entity record 408 "x y z", from the plurality entity records of the network database 108. The augment engine 217 may utilize at least one augmentation rule to augment a first positive contrast entity record 410 "x b z" and a second negative contrast entity record 412 "g j k". The augmentation rules may be any type including word deletion, span deletion, token reordering, and synonym substitution for augmentation or other token-level augmentation such as synonym replacement, random insertion, random swap, and random deletion, may also be used that increase the likelihood of generating positive contrast entity records.

In some embodiments, the illustrative contrastive optimization engine 219 utilizing an optimization function determines a loss function a first positive contrast entity record 410 and a second negative contrast entity record 412. The illustrative contrastive optimization engine 219 may the loss function to update the parameters of the self-contrastive engine 218 in order to minimize a similarity of the positive contrast entity record to the candidate entity record, and maximize a dissimilarity between the negative contrast entity record and the candidate entity record, the at least one processor(s) 209 may then feed the plurality of entity records to the self-contrastive engine 218 which determines the positive contrast entity records 414 "x y z" and the negative contrast entity records 416 "g j k". The illustrative index engine 220 may generate at least one index in a network database 108. In some embodiments, the illustrative index engine 220 of the augment module 200 may employ a scoring function to determine a score of the entity records. The scoring function may be any of but not limited to Manhattan, Euclidean distance, hamming distance, the dot product between two vectors, probabilistic NCE-based losses, or mutual information functions. The illustrative index engine 220 may index the positive contrast entity records into a positive contrast entity record index and merge the records as the entity records have been resolved with the candidate entity record. The positive contrast entity records 414 in the positive contrast entity record index may be merged as they likely share a high similarity with the candidate entity record 408.

In some embodiments and, optionally, in combination of any embodiment detailed above or below, the exemplary monitoring module having at least one machine learning module may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer module" and "module" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i TM; (13) IBM AIX™; (14) Binary Runtime Environment for Wireless (BREW) TM; (15) Cocoa (API) TM; (16) Cocoa Touch™; (17) Java Platforms™; (18) JavaFX™; (19) JavaFX Mobile; TM (20) Microsoft DirectX™; (21).NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary ASR system of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent tests for software agents that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary ASR system of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

The aforementioned examples are, of course, illustrative and not restrictive. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed:

1. A computer-implemented method comprising:
   receiving, by at least one processor, a dataset of entity records, the dataset comprising a plurality of entity records associated with one or more entities, wherein each entity record comprises at least one element;
   identifying, by at least one processor, a candidate entity record of the plurality of entity records;
   utilizing, by the at least one processor, first predefined rules of a set of predefined rules to generate a first augmented record by augmenting the at least one element of the candidate entity record with a first augmentation type;
      wherein the first augmentation type represents a positive contrast between the first augmented record and the candidate entity record based at least in part on the set of predefined rules;
   utilizing, by the at least one processor, second predefined rules of a set of predefined rules to generate a second augmented record by augmenting the at least one element of the candidate entity record with a second augmentation type;
      wherein the second augmentation type represents a negative contrast between the second augmented record and the candidate entity record based at least in part on the set of predefined rules;
   utilizing, by the at least one processor, at least one contrastive loss optimization to train parameters of an unsupervised self-contrastive machine learning language model to distinguish between similar entity records representing a same entity and dissimilar entity records represented different entities based at least in part on the at least one element of each entity record;
      wherein the at least one contrastive loss optimization trains the parameters based at least in part on:
         the positive contrast between the first augmented record and the candidate entity record, and
         the negative contrast between the second augmented record and the candidate entity record; and
   utilizing, by the at least one processor, an index engine to index the entity records determined to have a positive contrast with the candidate entity record;
      wherein the index engine indexes the identified entity records into at least one database table so as to merge the entity records having the positive contrast with the candidate entity record.

2. The computer-implemented method of claim 1 wherein, the set of predefined rules to generate an augmented record call for a random insertion of the at least one element of the candidate entity record.

3. The computer-implemented method of claim 1 wherein, the set of predefined rules to generate an augmented record call for a random deletion of the at least one element of the candidate entity record.

4. The computer-implemented method of claim 1 wherein, the set of predefined rules to generate an augmented record call for a random swap of the at least one element of the candidate entity record.

5. The computer-implemented method of claim 1 wherein, the set of predefined rules to generate an augmented record call for a span deletion of the at least one element of the candidate entity record.

6. The computer-implemented method of claim 1 wherein, the set of predefined rules to generate an augmented record call for randomization of the at least one element of the candidate entity record.

7. The computer-implemented method of claim 1 wherein, the index engine utilizes a hamming distance to determine a positive contrast with the candidate entity record.

8. At least one non-transitory computer-readable storage medium having encoded thereon software instructions that, when executed by at least one processor, cause the at least one processor to perform steps to:
   receive, by at least one processor, a dataset of entity records, the dataset comprising a plurality of entity records associated with one or more entities, wherein each entity record comprises at least one element;
   identify, by at least one processor, a candidate entity record of the plurality of entity records;
   utilize, by the at least one processor, first predefined rules of a set of predefined rules to generate a first augmented record by augmenting the at least one element of the candidate entity record with a first augmentation type;
      wherein the first augmentation type represents a positive contrast between the first augmented record and the candidate entity record based at least in part on the set of predefined rules;
   utilize, by the at least one processor, second predefined rules of a set of predefined rules to generate a second augmented record by augmenting the at least one element of the candidate entity record with a second augmentation type;
      wherein the second augmentation type represents a negative contrast between the second augmented record and the candidate entity record based at least in part on the set of predefined rules;
   utilize, by the at least one processor, at least one contrastive loss optimization to train parameters of an unsupervised self-contrastive machine learning language model to distinguish between similar entity records representing a same entity and dissimilar entity records represented different entities based at least in part on the at least one element of each entity record;

wherein the at least one contrastive loss optimization trains the parameters based at least in part on:
the positive contrast between the first augmented record and the candidate entity record, and
the negative contrast between the second augmented record and the candidate entity record;
utilize, by the at least one processor, an index engine to identify the entity records determined to have a positive contrast with the candidate entity record;
wherein the index engine indexes the identified entity records into at least one database table so as to merge the entity records having the positive contrast with the candidate entity record.

9. The at least one non-transitory computer-readable storage medium of claim 8, wherein the set of predefined rules to generate an augmented record call for a random insertion of the at least one element of the candidate entity record.

10. The at least one non-transitory computer-readable storage medium of claim 8, wherein the set of predefined rules to generate an augmented record call for a random deletion of the at least one element of the candidate entity record.

11. The at least one non-transitory computer-readable storage medium of claim 8, wherein the set of predefined rules to generate an augmented record call for a random swap of the at least one element of the candidate entity record.

12. The at least one non-transitory computer-readable storage medium of claim 8, wherein the set of predefined rules to generate an augmented record call for a span deletion of the at least one element of the candidate entity record.

13. The at least one non-transitory computer-readable storage medium of claim 8, wherein the set of predefined rules to generate an augmented record call for randomization of the at least one element of the candidate entity record.

14. The at least one non-transitory computer-readable storage medium of claim 8, wherein the index engine utilizes a hamming distance to determine a positive contrast with the candidate entity record.

15. A system comprising:
a non-transient computer memory, storing software instructions; and
at least one processor of a first computing device associated with a user;
wherein, when the at least one processor executes the software instructions, the first computing device is programmed to:
receive, by at least one processor, a dataset of entity records, the dataset comprising a plurality of entity records associated with one or more entities, wherein each entity record comprises at least one element;
identify, by at least one processor, a candidate entity record of the plurality of entity records;
utilize, by the at least one processor, first predefined rules of a set of predefined rules to generate a first augmented record by augmenting the at least one element of the candidate entity record with a first augmentation type;
wherein the first augmentation represents a positive contrast between the first augmented record and the candidate entity record based at least in part on the set of predefined rules;
utilize, by the at least one processor, second predefined rules of a set of predefined rules to generate a second augmented record by augmenting the at least one element of the candidate entity record with a second augmentation type;
wherein the second augmentation type represents a negative contrast between the second augmented record and the candidate entity record based at least in part on the set of predefined rules;
utilize, by the at least one processor, at least one contrastive loss optimization to train parameters of an unsupervised self-contrastive machine learning language model to distinguish between similar entity records representing a same entity and dissimilar entity records represented different entities based at least in part on the at least one element of each entity record;
wherein the at least one contrastive loss optimization trains the parameters based at least in part on:
the positive contrast between the first augmented record and the candidate entity record, and
the negative contrast between the second augmented record and the candidate entity record;
utilize, by the at least one processor, an index engine to identify the entity records determined to have a positive contrast with the candidate entity record;
wherein the index engine indexes the identified entity records into at least one database table so as to merge the entity records having the positive contrast with the candidate entity record.

16. The system of claim 15, wherein the set of predefined rules to generate an augmented record call for a random insertion of the at least one element of the candidate entity record.

17. The system of claim 15, wherein the set of predefined rules to generate an augmented record call for a random deletion of the at least one element of the candidate entity record.

18. The system of claim 15, wherein the set of predefined rules to generate an augmented record call for a random swap of the at least one element of the candidate entity record.

19. The system of claim 15, wherein the set of predefined rules to generate an augmented record call for a span deletion of the at least one element of the candidate entity record.

20. The system of claim 15, wherein the set of predefined rules to generate an augmented record call for randomization of the at least one element of the candidate entity record.

21. The system of claim 15, wherein the index engine utilizes a hamming distance to determine a positive contrast with the candidate entity record.

* * * * *